Nov. 14, 1939.   F. R. SWANSON   2,179,869
GRINDING MACHINE
Filed Jan. 18, 1937   3 Sheets-Sheet 1
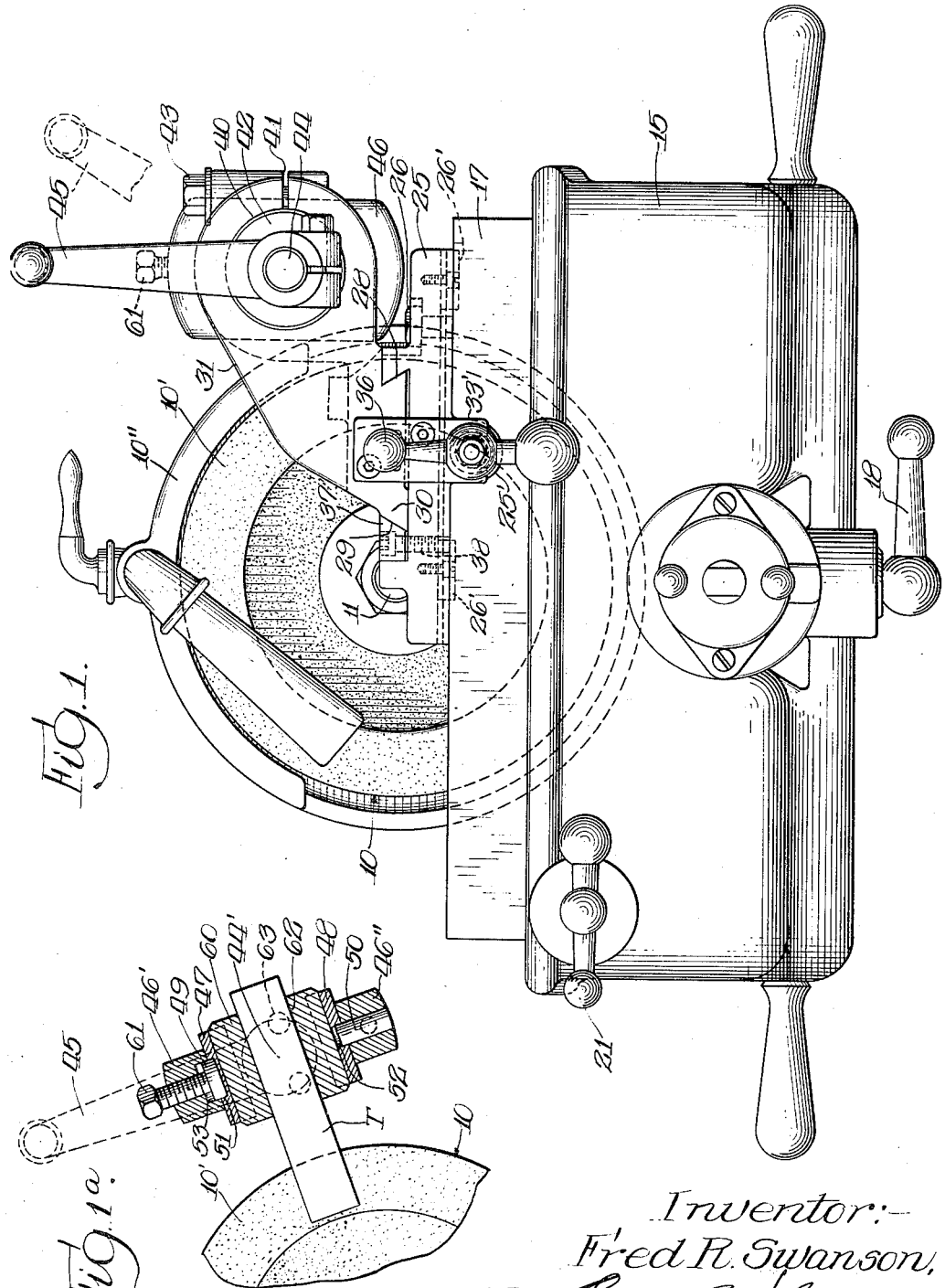
Inventor:—
Fred R. Swanson,
By [signature] his Atty.

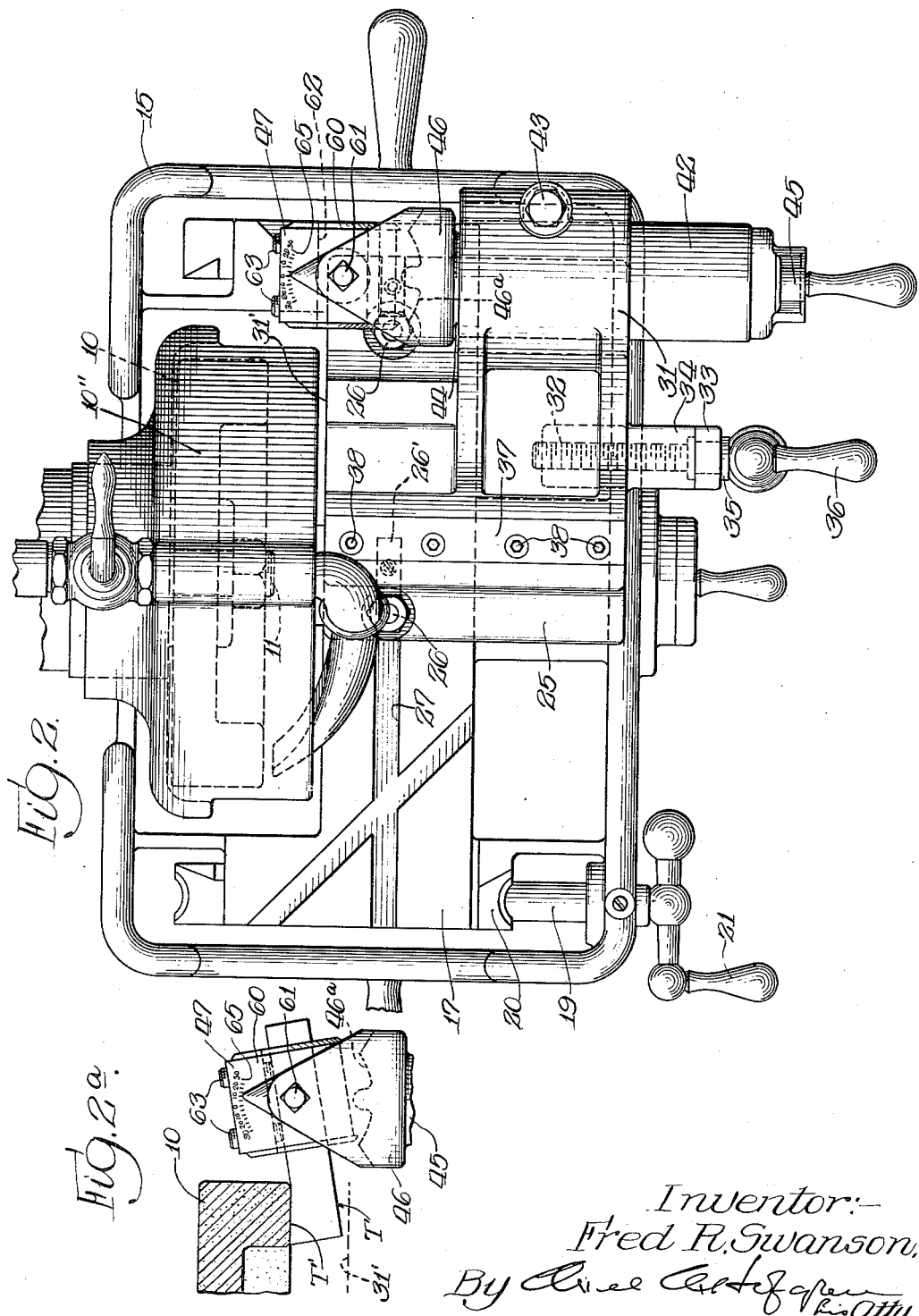

Nov. 14, 1939.　　F. R. SWANSON　　2,179,869
GRINDING MACHINE
Filed Jan. 18, 1937　　3 Sheets-Sheet 3
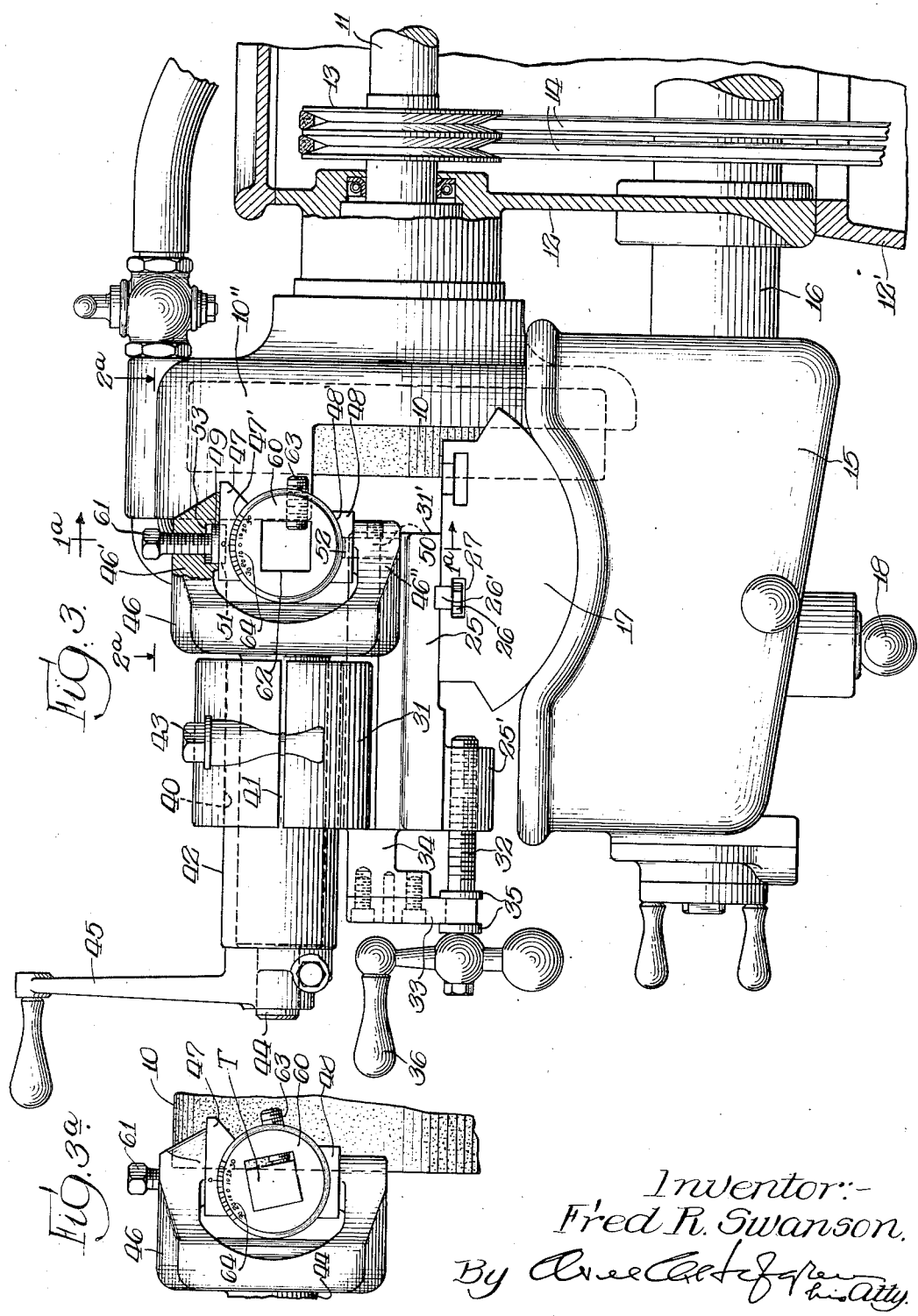
Inventor:-
Fred R. Swanson.
By [signature]
his Atty.

Patented Nov. 14, 1939

2,179,869

UNITED STATES PATENT OFFICE 2,179,869

GRINDING MACHINE

Fred R. Swanson, Rockford, Ill., assignor to Sundstrand Machine Tool Co., Rockford, Ill., a corporation of Illinois Application January 18, 1937, Serial No. 121,148

7 Claims. (Cl. 51—124)

The invention relates generally to grinding machines, and more particularly to an attachment for holding a tool while grinding the top or side rake thereon. It is the general object of the invention to provide a new and improved device of this character.

Another object is to provide such a holder which will permit a tool to be ground in a manner maintaining the trueness of the surface of the grinding wheel.

A more particular object is to provide an attachment suitable for use in a grinding machine of the type disclosed in the Paul S. Jackson Letters Patent No. 2,021,602, dated November 19, 1935, which will facilitate the grinding of the top and side rake of a tool.

Another object is to provide a new method of grinding a tool.

Other objects and advantages will become readily apparent from the following detailed description taken in connection with the accompanying drawings, in which:

Fig. 1 is a fragmentary elevation of the grinding machine of said Letters Patent having a preferred form of the invention mounted on the work support thereof.

Fig. 1ª is a fragmentary section along the line 1ª—1ª of Fig. 3, showing a tool in operative position.

Fig. 2 is a plan view of the machine of Fig. 1.

Fig. 2ª is a fragmentary elevation along the line 2ª—2ª of Fig. 3, showing a tool in operative position to be ground with a top rake.

Fig. 3 is a fragmentary elevation looking at the right hand end of Fig. 1.

Fig. 3ª is a fragmentary elevation of the machine in Fig. 3 with the tool holder adjusted for side clearance.

While I have illustrated in the drawings and shall herein describe a preferred form of the invention as applied to a grinding machine of the type disclosed in said Paul S. Jackson Letters Patent, it is to be understood that I do not intend to limit myself to the particular form and arrangement shown, but aim to cover all modifications and alternative constructions falling within the spirit and scope of the invention as expressed in the appended claims.

As illustrated in the drawings, the invention is embodied in a grinding machine in which a cup-shaped grinding wheel 10 is secured to one end of a horizontally disposed shaft 11 which is rotatably mounted in a head 12 supported on the upper end of a pedestal 12' and carries a pulley 13 arranged to be driven from a suitable motor (not shown) by means of V-belts 14. A work support 15 is mounted for oscillation on a cylindrical bar 16 extending horizontally from the head 12 and carries an angularly adjustable work table 17. The work support 15 may be clamped to the cylindrical bar 16 by means including a clamping screw device 18, and the work table 17 may be adjusted angularly and secured in its adjusted position by means of a shaft 19 which has a worm (not shown) thereon engaging a worm wheel 20 on the holder 17, the shaft 19 being rotatably mounted in the work support 15 and provided with an operating handle 21.

In grinding the top rake on a tool, it has heretofore been customary to move the tool radially inward partially across the face of the rim 10' of the grinding wheel and then to withdraw the tool radially outward. This method of grinding the tool, however, is disadvantageous in that it causes the grinding wheel to wear unevenly and requires a slight pause at the time the direction of movement of the tool is reversed, which increases the heating. Furthermore, this method confines the contact between the tool and wheel to such a small area as to cause excessive heating. To obviate these difficulties in grinding a tool, I have provided a device for mounting the tool and for swinging the end of the tool to be ground around a center eccentric to the axis of the grinding wheel and preferably around a center located beyond the periphery of the wheel, as indicated diagrammatically in Fig. 1ª.

The invention, in its preferred form, as illustrated herein, comprises a base 25 which may be secured to the upper surface of the table 17 by means of a plurality of bolts 26 (Fig. 2), the heads of which are secured in a T-slot 27 formed in the table. Blocks 26' fastened to the base fit into the narrow portion of the T-slot to serve as guides or locating devices. The base 25 is provided with opposed ways 28 and 29 which extend perpendicularly to the face of the grinding wheel and are beveled to receive a corresponding guide portion 30 formed along the lower part of a slide or bracket 31. This bracket may be moved toward and from the grinding wheel 10 by means of a feed screw 32 which is rotatably mounted on the bracket 31 (Fig. 3) by means of a plate 33 which is secured to a forwardly projecting portion 34 of the bracket and has a bifurcated lower end 33' which straddles the feed screw 32 intermediate a pair of collars 35 thereon. The feed screw engages a nut portion 25' of the base plate 25 and is provided with a suitable handle 36 to facilitate operation of the screw. Preferably one of the guideways for the bracket 31, as, for example, the way 29, is formed on a gib 37 secured to the base plate by means of a plurality of screw devices 38 so as to permit of taking up the gib when necessary.

The upper portion of the bracket 31 is herein formed with a cylindrical bore 40 (Fig. 1) and is split at 41 so that a bushing 42 may be clamped in the bore by means of a clamping bolt 43. A tool support is rotatably supported in the bushing 42 for oscillatory movement about an axis 44' (Fig. 1a) and comprises a shaft 44 which extends through the bushing and carries a handle 45 at one end (to facilitate manual oscillation of the shaft), and a somewhat U-shaped head 46 on the other end which is adjacent the grinding wheel. A pair of shoes 47 and 48 are pivotally mounted on the leg portions 46' and 46" of the head 46 respectively, the lower shoe 48 being mounted on a pin 50 which extends into a cylindrical recess 52 in the shoe, and the upper shoe 47 being mounted on a cylindrical plug 49 which fits into a cylindrical recess 51 in the shoe 47 and into a corresponding cylindrical recess 53 in the leg portion 46'. A cylindrically surfaced element or tool holder 60 is positioned intermediate arcuate surfaces 47' and 48' of the shoes 47 and 48, respectively, and is arranged to be clamped intermediate the shoes by means of a clamping screw device 61 threaded through the leg portion 46' of the head. The tool holder 60 preferably has a squared opening 62 into which the tool to be ground may be inserted and clamped by means of a pair of set screws 63.

It will be apparent that a tool T (Figs. 1a, 2a and 3a), secured in the squared opening 62, may be adjusted angularly about the axis of the cylindrically surfaced tool holder 60, as indicated by the scale 64, to a position such as that illustrated in Fig. 3a. Furthermore, the tool may be adjusted angularly about a perpendicular axis passing through the center of the pin 50 and plug 49, as indicated by the scale 65 (Fig. 2), to a position such as that illustrated in Fig. 2a. When properly adjusted the tool may be secured in its adjusted position by tightening the screw device 61. In this way a compound angular adjustment may be obtained about a pair of axes which are perpendicular to each other and also are perpendicular to the axis 44' of the oscillatory tool support. When properly secured in the tool holder, the hardened end T' of the tool may be swung across the face of the rim of the grinding wheel by oscillating the shaft 44 by means of the handle 45. Furthermore, the tool may be fed into engagement with the grinding wheel by means of the feed screw 32.

The head 46 is preferably recessed at 46a, as shown in Figs. 2 and 2a to provide clearance for the holder 60.

When the shaft 44 is oscillated about its center line 44' (Fig. 1a), the tool is preferably swung out of contact with the grinding wheel at each end of the stroke so that the momentary pause in movement of the tool at the time its direction is reversed takes place when the tool is out of contact with the wheel. This eliminates the heating which has heretofore been experienced when a tool is moved radially across the wheel and reversed while in contact therewith. Furthermore, it will be apparent that by oscillating the tool it contacts an enlarged area of the grinding wheel during the grinding operation and thereby further decreases the heating effect. In setting up the device to provide for such movement of the tool relative to the wheel, the bushing 42 is advanced in its supporting bracket 31 axially toward the wheel, and is clamped by the screw 43 in a position which provides for clearance of the rear edge of the tool with respect to the forward edge 31' (Fig. 2a) of the bracket 31, and the grinding wheel guard 10" is swung in a counter-clockwise direction (Fig. 1) about the axis of its supporting bearing, as provided in said Letters Patent, so as to provide for clearance in the upward stroke of the tool.

I claim as my invention:

1. A device of the character described comprising, in combination, a base adapted to be positioned adjacent the face of a grinding wheel and having a pair of guideways extending perpendicularly to the face of the grinding wheel, a bracket slidably mounted on said ways, means for feeding said bracket along said ways, a tool support rotatably mounted in said bracket having a head on the wheel-end thereof and an operating handle on the other end thereof, a tool holder having cylindrical supporting surfaces, means for mounting said tool holder on said head for adjustment about a pair of axes perpendicular to each other and to said tool support axis comprising a pair of shoes pivotally mounted in said head on one of said axes and having arcuate surfaces engaging the cylindrical surface of said tool holder, and means for clamping said shoes, holder and head together.

2. A device of the character described comprising, in combination, a base adapted to be positioned adjacent the face of a grinding wheel and having a pair of guideways extending perpendicularly to the face of the grinding wheel, a bracket slidably mounted on said ways, means for feeding said bracket along said ways, a bushing adjustable in said bracket longitudinally of said guideways, a tool support rotatably mounted in said bushing having a head on the wheel-end thereof and an operating handle on the other end thereof, a tool holder having a cylindrical supporting surface, means for mounting said tool holder on said head for adjustment about a pair of axes perpendicular to each other and to said tool support axis comprising a pair of shoes pivotally mounted in said head on one of said axes and having arcuate surfaces engaging the cylindrical surface of said tool holder, and means for clamping said shoes, holder and head together.

3. A tool grinding apparatus, having a base adapted to be positioned adjacent the face of a grinding wheel and having a pair of guideways extending perpendicularly to the face of the grinding wheel, a bracket slidably mounted on said ways, means for feeding said bracket along said ways, a tool support rotatably mounted in said bracket having a head on the wheel-end thereof and an operating handle on the other end thereof, a tool holder having cylindrical supporting surfaces, means for mounting said tool holder on said head for adjustment about a pair of axes perpendicular to each other and to said tool support axis comprising a pair of shoes pivotally mounted in said head on one of said axes and having arcuate surfaces engaging the cylindrical surface of said tool holder, and means for clamping said shoes, holder and head together.

4. A tool grinding apparatus, including a rotatably mounted grinding wheel, a work support adjacent said wheel, and a device for supporting a tool to be ground comprising a slide movable on said support toward and from said wheel, an oscillatory tool support mounted on said slide on an axis parallel to the grinding wheel axis and positioned beyond the periphery of the wheel, a tool holder, means for securing said tool holder to said oscillatory support for compound angular adjustment with respect to said oscillatory support on intersecting axes, and a single clamping means to fasten said holder in said compound angularly adjusted position in the support.

5. In a grinding machine having a rotatable grinding wheel with a radial grinding face, means for adjustably supporting a tool to be ground for oscillatory movement across the face of the grinding wheel comprising a cylindrical member having a rectangular opening extending longitudinally thereof for the reception of a tool to be ground and means for securing the tool in the opening, a pair of shoes having arcuate surfaces for engaging said cylindrical member and disposed on diametrically opposite sides to support said member rotatably therebetween, and a supporting means for said shoes mounted for rotation about an axis perpendicular to the axis of said cylindrical member, means pivotally mounting each of said shoes in said supporting means on a common axis perpendicular to the axis of said cylindrical member and the axis of said supporting means including a single adjustable member for clamping both said cylindrical member and said shoes in adjusted position.

6. In a grinding machine having a rotatable grinding wheel, means for adjustably supporting a tool to be ground for movement across the grinding face of the wheel comprising a cylindrical member adapted to carry in fixed position thereon a tool to be ground, a pair of shoes having arcuate surfaces for engaging said cylindrical member and disposed on diametrically opposite sides to support said member therebetween for rotation about its longitudinal axis, a supporting means for said shoes mounted for rotation about an axis perpendicular to the axis of said cylindrical member, and means pivotally mounting each of said shoes in said supporting means on a common axis perpendicular to the axis of said cylindrical member and the axis of said supporting means.

7. In a grinding machine having a rotatable grinding wheel, means for adjustably supporting an element to be ground for movement across the grinding face of the wheel comprising a holder adapted to carry in fixed position thereon an element to be ground, a support for said holder rotatably mounted and having a head at the end adjacent the grinding wheel and an operating handle on the other end for manually imparting oscillatory movement to said support, and means for suspending said holder within the head of said support comprising a device journaled in said head for adjustment about an axis perpendicular to the axis of said support and in turn providing a journal for said holder having an axis perpendicular to both the axis of said device and of said support.

FRED R. SWANSON.